United States Patent
Michalke et al.

(10) Patent No.: US 11,104,295 B2
(45) Date of Patent: Aug. 31, 2021

(54) METHOD FOR OPERATING A SAFETY SYSTEM FOR A MOTOR VEHICLE, SAFETY SYSTEM AND MOTOR VEHICLE

(71) Applicant: AUDI AG, Ingolstadt (DE)

(72) Inventors: Wolfgang Michalke, Ingolstadt (DE); Patricia Stadick, Munich (DE); Katharina Kunth, Ingolstadt (DE); Joachim Scheef, Buxheim (DE)

(73) Assignee: AUDI AG, Ingolstadt (DE)

( * ) Notice: Subject to any disclaimer, the term of this patent is extended or adjusted under 35 U.S.C. 154(b) by 242 days.

(21) Appl. No.: 16/159,082

(22) Filed: Oct. 12, 2018

(65) Prior Publication Data
US 2019/0111889 A1    Apr. 18, 2019

(30) Foreign Application Priority Data
Oct. 14, 2017 (DE) .................. 102017009573.6

(51) Int. Cl.
*B60R 22/48* (2006.01)
*B60R 21/015* (2006.01)

(52) U.S. Cl.
CPC ........ *B60R 22/48* (2013.01); *B60R 21/01546* (2014.10); *B60R 21/01566* (2014.10); *B60R 2022/4816* (2013.01); *B60R 2022/4825* (2013.01); *B60R 2022/4858* (2013.01); *B60R 2022/4866* (2013.01); *B60R 2022/4891* (2013.01)

(58) Field of Classification Search
CPC ............ B60R 22/48; B60R 2022/4808; B60R 2022/4816; B60R 2022/4825; B60R 2022/4833; B60R 2022/4841; B60R 2022/485; B60R 2022/4858; B60R 2022/4866; B60R 2022/4883; B60R 2022/4891; B60R 21/01544; B60R 21/01546; B60R 21/01548; B60R 21/0155

See application file for complete search history.

(56) References Cited

U.S. PATENT DOCUMENTS 3,359,539 A * 12/1967 Fink ................. G08B 21/22
                                                            180/270
3,757,293 A * 9/1973 Petersen, III .......... B60R 22/48
                                                            180/270
3,818,462 A * 6/1974 Anselmo ................ B60R 22/48
                                                            365/208

(Continued)

FOREIGN PATENT DOCUMENTS

DE       102015000664 A1    7/2016

*Primary Examiner* — Barry Gooden, Jr.
(74) *Attorney, Agent, or Firm* — Henry M. Feiereisen LLC (57) ABSTRACT

In a method for operating a safety system of a motor vehicle, a corresponding safety system, and a motor vehicle equipped with such safety system, status signals from several sensor devices are captured by the safety system, wherein the status signals indicate respective status change of a functional unit of the motor vehicle. Thereafter, a chronological order of the status changes is determined and evaluated to detect a consistency or an inconsistency with the proper application of a seat belt of the motor vehicle. If an inconsistency is detected and it persists over a predetermined period of time, a control signal is transmitted by the safety system to a safety device of the motor vehicle.

10 Claims, 2 Drawing Sheets

(56) References Cited

U.S. PATENT DOCUMENTS

| | | | | |
|---|---|---|---|---|
| 3,860,904 A * | 1/1975 | Andersen | B60R 22/48 | 180/270 |
| 3,895,346 A * | 7/1975 | Assfour | B60R 22/48 | 180/270 |
| 4,871,044 A * | 10/1989 | Strosser | B60K 28/04 | 180/273 |
| 5,883,441 A * | 3/1999 | Shoemaker | B60R 22/48 | 307/10.1 |
| 6,918,611 B1 * | 7/2005 | Winters | B60R 21/233 | 280/735 |
| 9,878,689 B1 * | 1/2018 | Jimenez | B60R 22/48 | |
| 10,377,417 B2 * | 8/2019 | Schmiedhofer | B62D 6/08 | |
| 10,493,950 B2 * | 12/2019 | Turnwald | B60R 22/48 | |
| 10,773,683 B1 * | 9/2020 | Ghannam | B60R 21/01544 | |
| 2003/0137411 A1 * | 7/2003 | Hagenbuch | B60R 22/48 | 340/457.1 |
| 2006/0049929 A1 * | 3/2006 | Lawrence | B60N 2/2845 | 340/457 |
| 2007/0085669 A1 * | 4/2007 | Becker | B60R 22/48 | 340/457.1 |
| 2007/0273139 A1 * | 11/2007 | Kuttenberger | B60R 21/01548 | 280/806 |
| 2008/0319602 A1 * | 12/2008 | McClellan | G07C 5/008 | 701/31.4 |
| 2011/0010037 A1 * | 1/2011 | Inayoshi | B60R 21/01546 | 701/31.4 |
| 2012/0112503 A1 * | 5/2012 | Masutani | B60R 22/023 | 297/216.1 |
| 2013/0207425 A1 * | 8/2013 | Fujii | B60N 2/002 | 297/217.1 |
| 2014/0156133 A1 * | 6/2014 | Cullinane | B60R 16/023 | 701/23 |
| 2014/0168441 A1 * | 6/2014 | Koike | B60R 21/01552 | 348/148 |
| 2015/0091348 A1 * | 4/2015 | Juchniewicz | B60N 2/2887 | 297/256.16 |
| 2016/0129881 A1 * | 5/2016 | Harda | B60R 21/01 | 701/45 |
| 2017/0369031 A1 * | 12/2017 | Seyffert | B60R 21/01566 | |
| 2018/0126949 A1 * | 5/2018 | Turnwald | B60R 22/48 | |
| 2018/0326944 A1 * | 11/2018 | Cech | G06K 9/00838 | |
| 2020/0216005 A1 * | 7/2020 | Stegmeier | B60R 22/48 | |
| 2020/0331415 A1 * | 10/2020 | Thomas | B60R 21/01552 | |

\* cited by examiner

METHOD FOR OPERATING A SAFETY SYSTEM FOR A MOTOR VEHICLE, SAFETY SYSTEM AND MOTOR VEHICLE

CROSS-REFERENCES TO RELATED APPLICATIONS

This application claims the priority of German Patent Application, Serial No. 10 2017 009 573.6, filed Oct. 14, 2017, pursuant to 35 U.S.C. 119(a)-(d), the content of which is incorporated herein by reference in its entirety as if fully set forth herein.

BACKGROUND OF THE INVENTION

The invention relates to a method for operating a safety system for a motor vehicle. The invention further relates to such a safety system and a motor vehicle having such a safety system.

The following discussion of related art is provided to assist the reader in understanding the advantages of the invention, and is not to be construed as an admission that this related art is prior art to this invention.

Seat belts in motor vehicles are today still an essential part of a safety concept. In order to ensure the safety of respective vehicle occupants, in particular in an accident situation, a proper and correct use of a seat belt for each vehicle occupant is indispensable. Unlike other safety devices of the motor vehicle, such as an airbag, however, the seat belt requires an active action—i.e. the correct application—by the respective vehicle or seat occupant. Experience has shown that for different reasons, such as a desire for comfort or freedom, it happens time and again in practice due to inattention or forgetfulness that the respective belt is not or improperly applied.

Against this background, vehicle manufacturer or outfitters in the US must design air bag systems for passive loads with vehicle occupants not wearing seat belts in order to meet for example the FMVSS 208 (Federal Motor Vehicle Safety Standard). Such design is often difficult and expensive.

There are already efforts to counteract the non-application of seat belts. For example, systems known from mass-produced vehicles emit a signal when a belt buckle is not locked during operation of the motor vehicle. Known systems register only when a buckle tongue is not inserted in the belt buckle. Applying the seat belt in the wrong way, i.e. improperly or incorrectly, or circumventing the process by inserting a dummy tongue not connected to the belt buckle into the belt buckle can thus not be detected. In reality, seat belts are frequently consciously or unconsciously applied in a wrong way, i.e. not properly, which can lead to a diminished restraint effect and thus to reduced safety.

It would therefore be desirable and advantageous to obviate prior art shortcomings and to provide an improved method and system that improves occupant safety of a motor vehicle.

SUMMARY OF THE INVENTION

According to one aspect of the present invention, with the method according to the invention, status signals from several, i.e. of at least two different sensor devices of the motor vehicle are detected by the safety system. The respective status signals indicate a status change caused by a vehicle user of a functional unit of the motor vehicle associated with the respective sensor device. Such a functional unit can be, for example, a door of the motor vehicle, a seat or a seat system of the motor vehicle, a seat belt or a safety system which may be or may include for example a belt retraction mechanism, a belt buckle of the motor vehicle or the like. Thus, for example, the vehicle user can unlock and open the vehicle door, sit down on the vehicle seat, extend or unroll the seat belt, and insert a belt tongue of the seat belt into the belt buckle. The vehicle user thereby causes respective status changes of the vehicle door, the vehicle seat, the seat belt or the belt retraction mechanism and the belt buckle.

Depending on the functional unit, the respective status change may be of a different kind. The status change of the vehicle door may, for example, relate to its closed or locked status, i.e., for example, indicate a transition of the vehicle door from an open status to a closed status. For the vehicle seat, the status change may indicate a change from an unoccupied status to an occupied status of the vehicle seat. A status change of seat belt or of the corresponding retracted or extended status may indicate a change in the extension or unroll status of the seat belt. Herein, the seat belt may in a first status, for example, be rolled up a maximum and in a second status at least partially unrolled, i.e. extended. For the belt buckle, the status change may, for example, indicate a change from a free or open status to an occupied or locked status. It will be understood that the status changes may also occur in a respective opposite direction.

For a functional unit, several statuses, i.e. also more than two different statuses may be defined and detected or determined. For example, with a seat occupancy sensor serving as a sensor device for detecting a status change of the vehicle seat different weight loads of the vehicle seat may be interpreted or defined as different statuses. Likewise, for example, different pull-out or roll-out lengths of the seat belt may be interpreted or defined as different statuses. Depending on the status, different status signals can then be transmitted from a sensor device to the safety system.

In a further method step, a chronological order of the status changes is determined based on the detected status signals. For this purpose, for example, a detection or input order of the status signals into the safety system can be evaluated in a data processing device of the safety system and/or at a data interface of the safety system and interpreted, in particular, as sequential order of the status changes. However, a signal propagation time of the status signals may also be considered and/or an information content of the status signals, such as a respective time stamp or the like, for determining or evaluating the chronological order of the status changes.

In a further method step, the chronological order of the status changes is evaluated for detecting or determining a consistency or inconsistency of the chronological order with the proper use of the seat belt of the motor vehicle by the vehicle user. In other words, it is determined based on the chronological order of the status changes by the safety system, in particular the data processing device of the safety system, whether an assumption that the vehicle user has put on the seat belt as proper, i.e. if the seat belt is properly applied by the vehicle user, is plausible. If, for example the status change, i.e. the extension or unrolling of the seat belt occurs prior to the status change, i.e. locking of the belt buckle, but before the status change, i.e. occupying or loading the vehicle seat, then this order of status changes or events is not consistent with the proper use of the seat belt. In such a scenario the seat belt may, for example, have been placed between the respective vehicle user or seat occupant and an arm rest part of the vehicle seat. Since the seat belt then obviously cannot perform the proper restraint effect or restraint function on the vehicle user, this is not the proper application, meaning that the seat belt is not used for its proper purpose.

When as part of the method an inconsistency in the chronological order of the status changes concerning the proper application of the seat belt is detected and the inconsistency is determined to continue over at least a predetermined period of time, a control signal is transmitted in a further process step by the safety system to a safety device, in particular a safety device of the motor vehicle. In other words, one can wait for the predetermined period of time. A status signal received, i.e. detected, during this period of time or wait time can then cause the consistency to be established or attained or re-established in the course of a new evaluation or a continuation of the evaluation. In this case, the inconsistency would persist for a shorter time than the predetermined period of time, so that the control signal would not be transmitted. Thus, for example, a corresponding ultimately unnecessary reaction of the safety device to the control signal and/or a reaction that restricts the comfort without a safety gain can advantageously be avoided. As a result, this advantageously reduces an impetus or motivation of the respective vehicle user to circumvent the proper application of the seat belt or the safety system. Thus, an overall improvement in the occupant safety of the motor vehicle, i.e. the safety for the respective vehicle users or vehicle occupants of the motor vehicle, can be achieved.

The predetermined period of time may be, for example, between 10 and 60 seconds, preferably 30 seconds. This gives each vehicle user, for example, sufficient time to adjust or adapt the seat belt as needed by disconnecting and then plugging or locking the belt buckle, to temporarily disconnect the seat belt to, for example, conveniently setting down an item of clothing, or the like, without being inconvenienced by a reaction of the safety device.

By detecting and evaluating, i.e. processing status signals from multiple sensor devices, i.e. status changes from several corresponding associated functional units, a respective chain or sequence, i.e. the chronological order of the status changes, i.e. of events or happenings in which the respective vehicle user is or was involved, can advantageously be determined, reconstructed or mapped. Since not only a single event or a single status change—such as locking of the buckle considered with conventional systems—is evaluated, but a broader or more extensive context is evaluated by taking into account changes other events and status changes or their temporal relationships, misidentifications or misinterpretations can advantageously be avoided, making it more difficult for the vehicle user to circumvent the proper application of the seat belt or of the safety system. By capturing and analyzing status signals from multiple sensor devices, the conduct of the respective vehicle user can be tracked and clear violations or inconsistencies can be recognized particularly early. The use of the safety system according to the invention can be used with particular advantage as a conclusive argument to render, for example, the hitherto prescribed fulfillment of the abovementioned FMVSS 208 superfluous. Thus, the present invention can advantageously contribute to reduced costs, a reduced development and manufacturing effort, and increased flexibility in a design and layout of the motor vehicle.

The safety device, to which the control signal is sent or transmitted, may in particular be part of the motor vehicle. The safety device can be part of the safety system itself, which especially ensures a simple and reliable transmission of the control signal and compatibility. The control signal can therefore be adapted, for example, to an actual functional range of the safety device. The safety device, however, may also be a stand-alone device or a stand-alone system of the motor vehicle or part of another system separate from the safety system. Therefore, a safety device already existing in the motor vehicle can advantageously be used by the safety system, thereby advantageously reducing the component cost and complexity of the safety system. For example, an alert or a warning may be issued by the safety device in response to the control signal. Likewise, for example a function of the motor vehicle may be triggered, switched or controlled by the safety device in response to the control signal.

Likewise, the safety device vehicle may be external, i.e. not be part of the motor vehicle. For example, an vehicle-external server device or a mobile terminal device or the like may serve or function as a safety device. It may be advantageous to emit more than one control signal with the safety system in order to trigger various functions or reactions and/or to control more than one safety device. Advantageously, staggering or cascading can be provided. In other words, for example, one or more escalation thresholds may be predetermined. Upon reaching or exceeding a certain escalation threshold, a predetermined, a predefined control signal precisely associated with this escalation threshold may be sent out. One or more escalation thresholds can, for example, be predetermined for different plausibility levels or confidence values of the recognized or identified inconsistency. This can be useful, since for example, a specific chronological order of status signals with higher reliability or probability, i.e. with a higher confidence value, can be recognized as being inconsistent with the proper use of the seat belt than a different chronological order.

Likewise, different periods of time during which the inconsistency persists, i.e. during which the duration of the inconsistency is ascertained, may, for example, be defined as escalation thresholds. Thus, for example, a first control signal, for example for outputting a message or a warning can be transmitted when reaching or exceeding the first predetermined period of time. Upon reaching or exceeding a longer, second time period, a second control signal may then be transmitted, for example to enable or trigger or switch a function intervening in a driving operation of the motor vehicle—such as automatic braking. With such a stepped procedure or reaction, the respective vehicle user may advantageously have the opportunity to react to the situation without unnecessarily or earlier than necessary influencing or impairing surrounding traffic or other road users—for example, by intervention in the driving operation of the motor vehicle.

When the seat belt is properly applied by the vehicle user in accordance with the present invention, it is certain that the vehicle user is held on or in the respective seat or the respective seating position during acceleration of the vehicle. The proper use of the seat belt in this case includes that the lock tongue of the seat belt is or will be inserted and secured in the respective belt buckle associated with the seat belt, for example snapped-in or locked. In this case, a reciprocal and unambiguous assignment between a specific seat belt and a specific belt buckle is always provided. An association between a specific seat belt and a specific belt buckle means here that the belt buckle is properly used—for example, as provided or predetermined by a manufacturer of the motor vehicle—for receiving and securing exactly this seat belt. In particular, for example, the belt buckle and/or the seat belt can be arranged at or adjacent to a vehicle seat or a seat system of the motor vehicle and designed and set up for securing a vehicle user, in particular an occupant of this particular seat or this particular seat system.

In addition to the status signals indicating a respective change in the status, it may be advantageously for the safety system to query or retrieve a respective current status or status of the sensor devices and/or the corresponding functional units. This can occur, for example, in regular time intervals, in particularly also independently detected occurred status changes. This can advantageously further improve the safety, since such a detected current status for detecting or determining consistency or inconsistency with the proper application of the seat belt can be evaluated. For example, when a status signal indicating a status change is not detected due to a malfunction or a manipulation—redundancy, i.e. an additional database, can be created or provided by retrieving and evaluating the current status(es). For example, if a belt buckle is unlocked, that is the seat belt securing the vehicle user is unlocked, during a ride, but the corresponding status signal is not captured, then it can still be recognized by subsequent querying and evaluating the current—i.e. open or released—status of the belt buckle whether the seat belt is not currently applied as proper. This approach makes it difficult to bypass the safety system and can thus further increase the safety of the occupants of the vehicle motor vehicle.

In an advantageous embodiment of the present invention, at least one status signal of at least one door latch—or a corresponding door sensor—and at least one belt buckle and at least one belt extension sensor and at least one seat occupancy sensor of the motor vehicle are detected as the status signals. The status signal from the door latch or the door sensor, i.e. for example a corresponding closing mechanism or closure status sensor a vehicle door, thereby indicates the closure status of the vehicle door, for example whether the vehicle door is open, closed, or locked.

It may be particularly advantageous that this status signal also indicates or includes, by which means the vehicle door was locked or unlocked. For example, it can be distinguished whether the vehicle door was opened or closed or locked or unlocked from the outside, for example by radio remote control, or by operating an external door handle or door lock, or whether the corresponding process, i.e. the corresponding status change was triggered from inside the motor vehicle. Depending on which of these situations occurred, a different status signal can be detected. In this way, a finer or more accurate representation of the real events and thus a more reliable evaluation can advantageously take place.

The status signal from the belt buckle or, for example, from a buckle sensor arranged in the belt buckle can indicate whether the belt buckle is open or closed or locked, i.e. whether currently a lock tongue is inserted in the belt buckle, in particular whether a tongue was recently inserted into the belt buckle or removed therefrom.

The status signal from the belt extension sensor may indicate whether the seat belt is currently being extended or rolled up. The status signal of the belt extension sensor can also provide a current length of extension. The length of the extension indicates how far the seat belt is pulled out or unwound or unrolled from a pull-out region or a belt retraction mechanism and the like compared to a rest position or a non-use position. The status signal of the belt extension sensor may, for example, also indicate a beginning or start time point of a current pull-out or roll-up motion of the seat belt. Advantageously, this makes it particularly easy to determine a precise and detailed sequence of as many events or status changes as possible. A greater number of events or status changes, whose chronological order can be determined or related to each other, allows a more accurate or more reliable evaluation of the consistency or inconsistency of the proper application of the seat belt. For example, if the beginning of the withdrawal of the seat belt from its non-use position takes place before locking the buckle, then this is consistent with the proper application of the seat belt. However, a more detailed evaluation may indicate an inconsistency, for example, when the buckle is locked before the extended length of the belt has reached a predetermined minimum value, below which it may not be possible that the seat belt or the belt tongue is inserted in the assigned belt buckle as proper. This minimum value of the extended length can therefore also form one of the abovementioned escalation thresholds or threshold values.

The status signal from the seat occupancy sensor may indicate whether a respective vehicle seat or a respective seat system of the motor vehicle is free, i.e. unoccupied, or is taken, i.e. occupied. Particularly advantageously, this status signal can also indicate whether the vehicle seat is occupied or weighted down by a person or by an object, for example an item of luggage. The control signal optionally transmitted by the safety system may then advantageously take into account, i.e. be generated or selected in dependence thereof, whether the vehicle seat is occupied by a person or an object. For example, securing a person may have a higher priority for occupant safety than securing objects, such that, for example, if an inconsistency with the proper use of the seat belt is detected when the vehicle seat is occupied by an object, only a corresponding message is triggered or outputted by the control signal, however not a control signal that can intervene in the operation of the motor vehicle. As a result, an improved ease of use, i.e. an improved flexibility in the use of the motor vehicle, can advantageously be achieved.

The status signals of the door lock, the belt buckle, the belt extension sensor, and of seat occupancy can together enable particularly reliable, with minimal effort, recognition of the consistency or inconsistency of the chronological order of the corresponding status changes or status signals when the seat belt is applied as proper.

Particularly advantageously, a status signal individually associated with the corresponding sensor device or functional unit can be detected for each vehicle door, for each vehicle seat or each seat system, for each seat belt and/or for each belt buckle of the motor vehicle. In other words, the status signals from several identical or similar sensor devices or functional units can be distinguished, i.e. individually assigned to a particular sensor device or functional unit. For example, at a first status change—such as a locking of a first belt buckle—another status signal can be detected than at a different second status change—for example locking of a second buckle that is different from the first buckle. As a result, a respective consistency or inconsistency of an individual chronological order of status changes relevant for a vehicle user or a vehicle seat that occurs simultaneously or with a temporal overlap can be detected for a plurality of vehicle users and/or for a plurality of vehicle seats.

Each status signal from a specific sensor device can be detected individually, i.e. individually and independently of other or further status signals. This advantageously enables use of the present invention in a plurality of, in particular differently equipped, motor vehicles. Thus, for example, only one signal or a selection of signals may be detected from the status signals of the door lock, the belt buckle, the belt extension sensor, the seat occupancy sensor and/or other sensor devices of the motor vehicle, for example when the motor vehicle does not have all these corresponding sensor devices and/or when no status signal or no status signal compatible with the safety system is sent out by the sensor devices.

In a further advantageous embodiment of the present invention, the evaluation includes a comparison of the chronological order of the status changes with at least one predetermined chronological order of status changes from a multiplicity of such predetermined sequences. A respective predetermined evaluation as consistent or inconsistent is associated with the proper application with each predetermined chronological order of status changes. In other words, a list, a database or the like of several, at least two different time sequences of status changes is provided for example in a data store of the safety system. For each of these sequences, an additional value is stored, indicating whether the respective sequence is consistent or inconsistent with the proper use of the seat belt. The particular chronological order can then be compared, for example, serially or in parallel, with one or more of the predetermined sequences until conformity with one of the predetermined sequences is found. Particularly advantageously, it can then be detected or determined with very little effort whether an inconsistency is present, for example by eliminating real-time modeling of the behavior of the respective vehicle user, by reading out the additional values associated with the conforming sequence.

In a further advantageous embodiment of the present invention, the evaluation includes a rule-based evaluation on the basis of a plurality of rules, i.e. on the basis of at least two predetermined rules. These predetermined rules specify for the status changes or the status signals, whether at least one other of the status signals is consistent or inconsistent with the proper application of the seat belt following a respective occurrence or detection before or after at least another of the status changes or at least another of the status signals. The rules can preferably be directly or indirectly predetermined for all status signals or status changes detectable or processed by the safety system.

An indirect guideline or a direct rule can here explicitly define for a status signal or a status change a temporal relation to one or more other status changes or status signals or corresponding capture times and an assignment or assessment as consistent or inconsistent. An indirect guideline or an indirect rule for a status signal or a status change may, for example, implicitly or emergently result from one or more other rules, particularly under the assumption or requirement that all predetermined rules are consistent with each other. For example, an inverse or negating need not be explicitly specified for every rule. Overall, with rule-based evaluation, an inconsistency can be detected particularly flexibly and with particularly low memory space requirements. In particular, a single rule may be optionally formulated in more compact form than a sequence of several status changes and at the same time be applied to a number of different sequences of status changes, status signals or respective detection times.

In a further advantageous embodiment of the present invention, the control signal is outputted to a warning device, whereafter a warning is then issued by the warning device to the vehicle user. In other words, the control signal is designed for this purpose, i.e. it serves to control or trigger the warning device to output the warning. The warning may be, for example, optical and/or acoustic. The warning device may be or include, for example, a dedicated loudspeaker. Likewise, an already existing device of the motor vehicle, such as an infotainment system, may be used as a warning device. Additionally or alternatively, the control signal or a further control signal, for example, may be transmitted to a mobile phone (smartphone), or another electronic device, for example, an electronic wristwatch (smartwatch) or a portable electronic device (wearable), in particular of the vehicle user. Overall, it can thus be advantageously ensured that the vehicle user can be made aware of the detected inconsistency.

Likewise, the control signal or a further control signal may be sent or transmitted to a receiver that is not part of the vehicle, in particular a vehicle-external receiver. For example, a given third party, such as a parent or another contact or trusted person of the vehicle user, an owner of the motor vehicle or the like, may be informed of a detected inconsistency and/or subsequently introduced measure or reactions. This can ultimately advantageously contribute to enhanced safety in traffic, for example by targeted awareness training in the importance of the proper application of the seat belt.

In an advantageous embodiment of the present invention, the control signal or a corresponding further control signal is sent to an engine controller of the motor vehicle to thereby limit a driving speed of the motor vehicle to a predetermined maximum value, in particular to at most or less than 25 km/h or 15 mph (miles per hour). If the motor vehicle is at rest when the inconsistency is recognized, i.e. is stationary, or if the motor vehicle moves with a speed not higher than the predetermined maximum value, then the control signal can prevent the motor vehicle from accelerating to more the predetermined maximum value, especially as long as the inconsistency exists. If the motor vehicle moves at a speed greater than the speed specified by the maximum value at the time the inconsistency is recognized, then the control signal can prevent depression of the accelerator of the motor vehicle. This means that in such a case a current travel speed of the vehicle is automatically reduced in response to the control signal at least to the predetermined maximum value. This may be accomplished, for example, by forced coasting and/or by automatic braking of the motor vehicle. If the vehicle user applies in such case an accelerator pedal to accelerate the motor vehicle or to maintain a current driving speed, then this operation of the accelerator pedal is not converted by the engine control unit to a corresponding activation of the engine of the motor vehicle. The safety of the vehicle user can advantageously be enhanced by limiting the driving speed, since the risk of injury to vehicle occupants not properly secured by a seat belt can be significantly reduced at lower speeds. At the same time, the vehicle user can safely maneuver the motor vehicle at a non-zero predetermined maximum value of the vehicle speed of the motor vehicle, because the range of freedom of movement of the vehicle user not properly wearing the seat belt can be increased, for example, by providing improved all-round visibility. Particularly advantageously, the maximum value may be set in conformity with appropriate governmental regulations or guidelines.

Advantageously, the control signal may be transmitted to the safety device only when the instantaneous velocity of the motor vehicle reaches or exceeds the predetermined maximum value or another predetermined speed threshold value. This can advantageously prevent unnecessary activation of devices or equipment of the motor vehicle, thereby reducing overloading or loading of data links, for example, in a bus system of the motor vehicle.

In a further advantageous embodiment of the present invention, the functional units and/or the sensor devices are monitored continuously or regularly at predetermined time intervals both when standing still and when driving, i.e. during travel or movement of the motor vehicle, with respect to status changes and/or their current status. Evaluation of the changes and/or of the current statuses occurs each time a status signal indicative of a status change is detected and/or in predetermined, especially regular, time intervals. During each evaluation, all of the current status signals and/or statuses, i.e. data or data signals descriptive of the corresponding current status, can then be processed in each case for each sensor device and/or for each functional unit. Thus, the proper application or position of the seat belt can be controlled or monitored independent of a current driving or movement status of the motor vehicle. In particular, the safety system is in this way much more difficult to manipulate or to bypass which can contribute to improved safety for the occupants of the motor vehicle.

In a further advantageous embodiment of the present invention, a result of the evaluation is checked for plausibility by comparison with detection results from another system of the motor vehicle, in particular an optical monitoring system of the interior space, relevant for the proper use of the seat belt by the vehicle user. In other words, therefore, two mutually independent systems, preferably based on different functional or detection principles, are used for detecting the proper or improper application or placement or a corresponding consistency or inconsistency. For example, with the optical monitoring system of the interior space and automated image processing or image or object recognition, the placement of the seat belt can be detected, allowing the proper or improper application or placement be recognized or checked. The plausibility check made possible by using two different systems advantageously enhances the reliability in the correct detection of inconsistencies, i.e. the rate of false identifications is reduced. In addition, manipulation or bypassing by the vehicle user can be made more difficult, thus increasing the safety of the occupants of the motor vehicle.

According to another aspect of the invention, a safety system for a motor vehicle has a data processing device with a data memory and at least one data interface for detecting and transmitting data signals. The safety system, in particular the data processing device is designed to capture status signals of several sensor devices of the motor vehicle via the at least one data interface, wherein the status signals indicate in each case a status change of functional unit of the motor vehicle associated with the respective sensor device status and caused by a vehicle user. The safety system, in particular the data processing device, is furthermore designed to process the status signals and determine therefrom the chronological order of the status changes. The safety system, in particular the data processing device, is furthermore designed to evaluate the determined chronological order and to determine or recognize therefrom a consistency or inconsistency of the determined chronological order with a proper application or placement of a seat belt on the vehicle user. The safety system, in particular the data processing device, is furthermore designed, when an inconsistency in the determined chronological order in the proper application or placement of the seat belt by or on the vehicle user persists for at least one predetermined period of time, to transmit via the at least one data interface or via a further data interface of the safety system a control signal to a safety device of the motor vehicle.

In other words, the safety system is designed to execute at least one variant of the method according to the invention, in particular automatically. The safety system, in particular the data processing device, can therefore have a correspondingly configured processing device for executing at least one embodiment of the method according to the invention. For this purpose, the processing device can have at least one microprocessor and/or at least one microcontroller. Furthermore, the processing device may include program code adapted, when executed by the processing device, to carry out the embodiment of the method according to the invention. The program code may be stored, for example, in a data memory of the processing device or in the data memory of the safety system.

As the data memory, it is particularly advantageous to use a ring memory for recording or storing the status signals or optionally additional data. Likewise, for each sensor device only the respective last detected status signal or a predetermined number of status signals or status changes or statuses derived therefrom may be stored in the data memory. This advantageously enables reducing the memory space compared to permanent storage of all detected status signals, without impairing the safety for the occupants of the motor vehicle.

According to another aspect of the invention, a motor vehicle has the aforedescribed safety system according to the invention. In addition, the motor vehicle according to the present invention has several sensor devices for detecting status changes of a respective associated functional unit of the motor vehicle and to transmit status signals to the safety system, that specify the detected status changes.

Likewise, the safety system according to the invention may include one, several or all of the sensor devices and/or the corresponding data connections.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments described below are preferred embodiments of the invention. In the exemplary embodiments, the described components of the embodiments each represent individual features of the invention to be considered independently of each other, which each independently develop the invention further and which are thus to be regarded as part of the invention individually or in any other than the shown combination. Furthermore, the described embodiments can also be supplemented by further features of the invention which have already been described.

Figure 1:
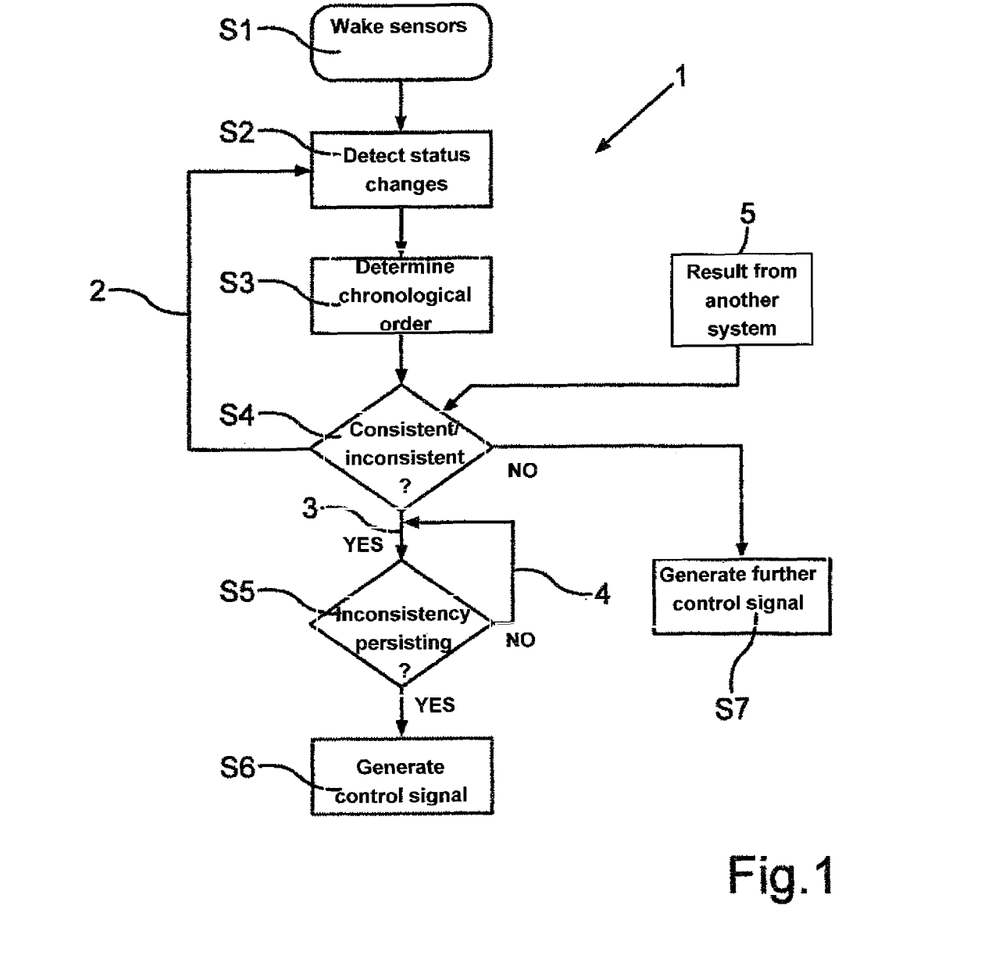
FIG. 1 shows by way of example a schematic flowchart of a method for operating a safety system for a motor vehicle according to the present invention.
Figure 2:
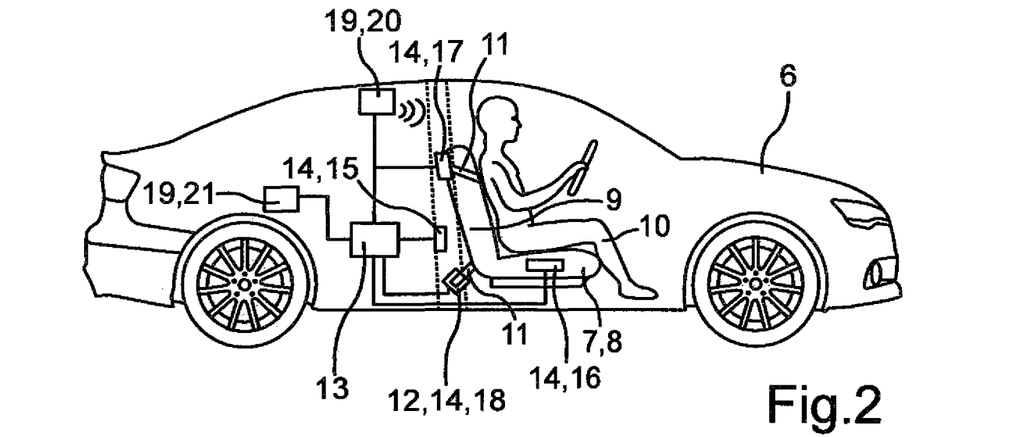
FIG. 2 shows a schematic and sectional side view of a motor vehicle with a safety system according to the present invention for detecting a consistency or inconsistency with a proper application of a seat belt.
Figure 3:
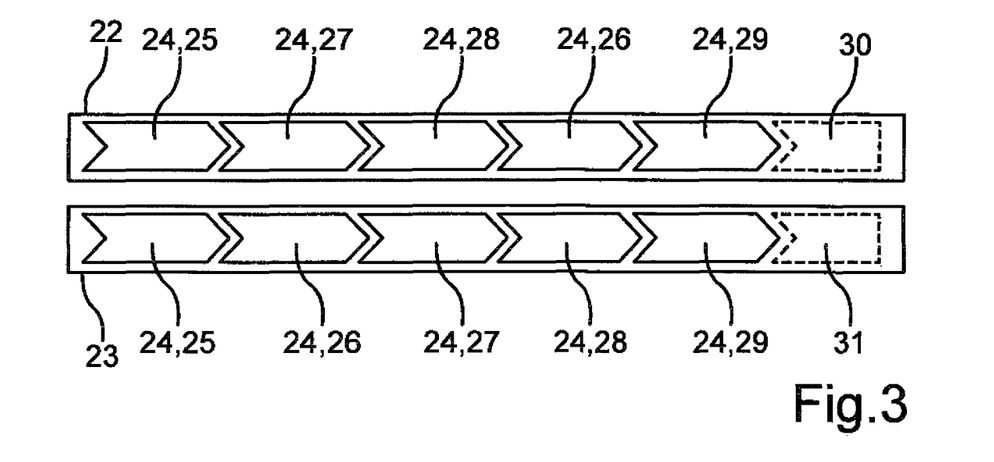
FIG. 3 is a schematic diagram of two temporal sequences of status changes that can be evaluated to detect consistency or inconsistency of proper application of a seat belt.

Turning now to the drawing, and in particular to FIG. 1, there is shown schematically an exemplary flowchart 1 for a method for operating a safety system for a motor vehicle. This method will now be explained with reference to all figures. FIG. 2 shows a schematic sectional side view of a motor vehicle 6, in which the method can be used. FIG. 3 shows a first sequence 22 and a second sequence 23 of events which can be evaluated in the context of the method.

The motor vehicle 6 has a seat 7 with a cushion part 8 and a backrest part 9. The seat 7 is preferably occupied by a vehicle user 10. Associated with the seat 7 and hence with the vehicle user 10 are a seat belt 11 and a belt buckle 12 provided for securing or holding the seat belt 11. The motor vehicle 6 also has a safety system 13 and several sensor devices 14 connected thereto via respective data links. The safety system 13 can therefore have corresponding data interfaces as well as a data memory and a data processing device, for example a microchip or a microcontroller.

The sensor devices 14 presently include a door sensor 15 for detecting a closing- or locking status of a vehicle door of the motor vehicle 6, a seat occupancy sensor 16 arranged in the cushion part 8, belt extension sensor 16—arranged here for example on or in a B-column of the motor vehicle 6—for detecting an extension or a extended length of the seat belt 11, and a seat buckle sensor 18 arranged here in or on the belt buckle 12 for detecting a closing—or locking status of the belt buckle 12. The vehicle 6 also includes at least one, in this case two, safety devices 19. The safety devices 19 include here a warning device 20 for issuing a warning to the vehicle user 10 and an engine controller 21 for controlling or actuating an unillustrated drive motor of motor vehicle 6. The safety devices 19 are also connected with the safety system 13 via respective data connections The method can be started at a method step S1. Here, for example, the safety system 13 and some or all of the sensor devices 14 may be placed in operation or woken up from a sleep or resting mode. Such a wake-up or activation of one of the sensor devices 14 can be triggered, for example, by an action of the vehicle user 10. For example, the vehicle user can unlock the motor vehicle 6 and/or open the vehicle door from outside by way of a radio remote control, which can result in waking up or activating the door sensors 15 or a corresponding door lock, which can be registered or detected.

In general, therefore, the method can begin, for example, with a status or status change 24 detected by or with of one of the sensor devices 14 (see FIG. 3) of a functional unit of the motor vehicle 6 assigned to the respective sensor device 14. At the beginning of the process, a new or empty recording or sequencing of corresponding status signals, which each indicate a status change 24 caused by the vehicle user 10, may be started or triggered. Accordingly, for example, a sequence of such status signals or status changes 24 recorded in a previous operating cycle of the motor vehicle 6 and/or of the safety system 13, i.e. of the method, may be discarded or reset. Overall, this approach has the advantage, for example, that the method can also be successfully carried out in unusual situations. Such a situation may occur, for example, if the motor vehicle 6 is not unlocked before the vehicle user 10 enters, i.e. the vehicle door is not opened, for example when the vehicle 6 is sitting in a garage over night with an opened door. Because of the phase of inactivity associated therewith, the motor vehicle 6 or its systems, for example the safety system 13 and the sensor devices 14, may not be placed in the idle or sleep mode or status.

In a method step S2, respective status changes 24 can be detected by the sensor devices 14 and corresponding status signals can then be transmitted to the safety system 13. This can take place, for example, via or by means of a CAN bus, a FlexRay system or the like. Accordingly, the status signals can then be detected by the safety system 13 as input signals at one or more data interfaces.

By way of example, a sequence of five status signals 24 may be detected, for example corresponding to the first sequence 22 shown schematically in FIG. 3. Therein, a door opening 25 detected by the door sensor 15 is first identified. Thereafter, a belt extension 27 of the seat belt 11 detected by the belt extension sensor 17 is identified. Belt buckle locking 28 detected by the buckle sensor 18, i.e. locking of the buckle 12, is then identified. Thereafter, seat occupancy 26 detected by the seat occupancy sensor 16 is identified. Thereafter, additionally, for example, an engine start 29 of the drive motor of the motor vehicle 6, an actuation of the ignition of the motor vehicle 6 and/or a movement of the vehicle 6 can be detected.

In a method step S3, a chronological order of the detected status signals or of the corresponding underlying events or status changes 24 is determined. This can be done, for example, on the basis of an input sequential order of the status signals, i.e. the chronological order of signal inputs to the safety system 13, and/or by further processing or evaluating the detected status signals. The latter may be advantageous, for example, when an actual sequence of real events, i.e. of the actual status changes 24 differs from the input or detection sequential order of the corresponding status signals at the safety system 13—for example due to different signal propagation times from the respective sensor device 14 to the safety system 13.

In a method step S4, the particular chronological order is processed or evaluated, so that it can be recognized or determined whether the particular order, in this case the first sequence 22, is consistent or inconsistent with the proper use of the seat belt 11 by the vehicle user 10. A corresponding result from the evaluation can be checked for plausibility with respect to an identification result 5 from another system of the motor vehicle 6, schematically indicated in FIG. 1, especially an optical monitoring system of the interior space, for example compared or adjusted.

Irrespective of the result of the evaluation, the detection of further status signals or status changes 24 or a corresponding monitoring of the sensor devices 14 can be continued, in particular also be maintained during further method steps, which is indicated schematically here by a loop 2.

In the present example, the vehicle user 10 has the seat belt 11 initially routed across the backrest part 9 and secured in the buckle 12, and has only then sat down on the seat 7. The seat belt 11 then runs between the backrest part 9 and the vehicle user 10, i.e. is not properly applied. Accordingly, the safety system 13 recognizes that the particular order, i.e. the first sequence 22 of status changes 24 is inconsistent with the proper application of the seat belt 11 by the vehicle user 10. The safety system 13 hence detects an inconsistency 30 when evaluating the first sequence 22.

Likewise, the first sequence 22 and the second sequence 23 may be provided as predetermined sequences of status changes, for example in the data memory of the safety system 13. The chronological order determined in the respective application can then be compared with the provided sequences 22, 23 until a match is found. As a result, the evaluation or pronouncement associated with the first sequence 22 in the form of an inconsistency 30 can then also be read out from the data memory.

Since in the present case the inconsistency 30 has been detected, the method follows a path 3 to a method step S5. In the method step S5, it is determined whether the inconsistency 30 persists for or during at least a predetermined period of time, i.e. exists already for at least the predetermined period of time. If this is not the case at a current time, then one can wait to the end of the predetermined period of time, which is indicated here by a loop 4. If the predetermined period of time has expired, i.e. if the inconsistency 30 already exists for at least the predetermined time period, the method continues with a method step S6.

In the method step S6, a control signal is generated by the safety system 13 and sent or transmitted to at least one of the safety devices 19. For example, the control signal can cause the warning device 20 to output a warning or a message to the vehicle user 10. Also, the control signal or a further control signal may cause, for example, the engine controller 21 to limit the speed of the motor vehicle 6 to a predetermined maximum value.

In another case, for example, the second sequence 23 of status changes 24 can be detected or determined. In the second sequence 23, the seat occupancy 26 is initially detected or determined after the door opening 25, and only then are the belt extension 27 and finally the buckle lock 28 detected and determined before the engine start 29. This is consistent with the proper application of the seat belt 11 by the vehicle user 10. Therefore, as a result, a consistency 31 with the proper application would then be recognized and assigned to the second sequence 23.

Likewise, for example, the vehicle user 10 can take measures within the specified time period in step S5 or in response to the warning issued by the warning device 20, to properly apply the seat belt 11. These measures or status changes 24 can trigger corresponding status signals which can be detected and evaluated by the safety system 13. In a continuation or a subsequent iteration of the method step S4, it can then be established, for example, that a determined chronological order is consistent with the proper application of the seat belt 11. Accordingly, in a method step S7, at least one further control signal can be generated and transmitted by the safety system 13. In response to this further control signal, outputting the warning by the warning device 20 can for example be canceled, and/or the limitation of the driving speed of the motor vehicle 6 by the engine controller 21 can be canceled—i.e. a reaction opposite to the first or previously transmitted control signal can be triggered.

Overall, the aforedescribed examples show how by temporal sequencing of status signals a correct, i.e. proper, seat belt application status of the seat belt 11 can be determined. Customer behavior, i.e. the behavior of the vehicle user 10, can be mapped by recognizing a respective sequential order of status signals or status changes 24. Noticeable sequences of status changes of status signals 24 that are defined, for example, in advance can then be identified as incorrect use of the seat belt 11. In this case, several 100—for example 200 to 400—different sequences, i.e. permutations of chronological sequences, can be distinguished. This enables a detailed and reliable evaluation with respect to consistency 31 or inconsistency 30 in the proper application of the seat belt 11.

Particularly advantageously, the status changes 24 that occur when the vehicle user 10 enters the motor vehicle 6, as well as status changes 24 that occur while driving the motor vehicle 6 can be detected and evaluated. A status signal can also be detected during driving and evaluated—particularly in connection with or in the context of status signals already detected before a trip—in order to detect a change in the application status of the seat belt, in particular a status inconsistent with the proper application or placement of the seat belt 11. For example, the belt extension sensor 17 can detect a retraction or roll-up of the seat belt 11 by at least a predetermined minimum length—for example, at least 70% of the extracted length that existed before the start of the journey—and a corresponding status signal can then be transmitted to the safety system 13. Such a status signal can indicate or be interpreted as unbuckling of the seat belt by the vehicle user 10, i.e. release of the seat belt 11 from the buckle 12. However, unbuckling during the ride has the result that the seat belt 11 it is no longer properly applied, i.e. a corresponding inconsistency. In this case, too, the control signal can be generated and transmitted in accordance with method steps S5 and S6.

It is a particularly advantageous that presently improper use of the seat belt 11 can be detected solely by evaluating sequences of events, i.e. the status changes 24, and by analyzing logical relationships, wherein a dedicated additional sensors in the motor vehicle 6, solely provided for this purpose, can be dispensed with, since the sensor devices 14 already existing for other purposes can be used.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a safety system for a motor vehicle, comprising:
   detecting with the safety system respective status signals from a plurality of sensor devices of the motor vehicle, wherein the respective status signals each indicate a status change of a functional unit of the motor vehicle associated with a respective sensor device caused by a vehicle user;
   determining a chronological order of the status changes based on the status signals;
   evaluating the chronological order so as to recognize a consistency or an inconsistency of the chronological order commensurate with a proper application of a seat belt of the motor vehicle by the vehicle user;
   detecting with an optical interior space monitoring system of the motor vehicle in conjunction with an automated image processing a proper or improper placement of the seat belt;
   determining the consistency or the inconsistency by comparing a result of the evaluation of the chronological order with a detection result taken from the optical interior space monitoring system of the motor vehicle; and transmitting with the safety system a control signal to a safety device of the motor vehicle only when the determined inconsistency persists over at least a predetermined period of time.

2. The method of claim 1, wherein the detected respective status signals comprise
at least one status signal of at least one door lock of the motor vehicle, and
at least one status signal of at least one belt buckle of the motor vehicle, and
at least one status signal of at least one belt extension sensor of the motor vehicle, and
at least one status signal of at least one seat occupancy sensor of the motor vehicle.

3. The method of claim 1, wherein the evaluating the chronological order comprises comparing the chronological order of the status changes with at least one predetermined chronological sequence order of status changes from a plurality of predetermined sequences, with a predetermined rating as consistent or inconsistent with the proper application of the seat belt being assigned to each of the predetermined sequences.

4. The method of claim 1, wherein the evaluating the chronological order comprises a rule-based evaluation of the chronological order based on a plurality of predetermined rules, which specify for the status changes whether a respective occurrence of one of the status changes before or after at least one other of the status changes is consistent or inconsistent with the proper application of the seat belt.

5. The method of claim 1, wherein the control signal is outputted to a warning device, whereafter a warning is outputted to the vehicle user.

6. The method of claim 1, wherein the functional units are monitored continuously for the status changes or a respective current status, or both, while the motor vehicle is moving or at a standstill, and wherein the chronological order is evaluated at each detection of DE the status signal or in predetermined time intervals, or both.

7. The method of claim 1, wherein the control signal is transmitted to an engine controller of the motor vehicle, with the engine controller limiting a driving speed of the motor vehicle to a predetermined maximum value.

8. The method of claim 7, wherein the predetermined maximum value is 25 km/h or 15 mph or less.

9. A safety system for a motor vehicle, comprising:
a data processing device with a data memory and a data interface for detecting and transmitting data signals,
wherein the safety system is configured to
detect, via the data interface, status signals of several sensor devices of the motor vehicle, wherein the status signals each indicate a status change of a functional unit of the motor vehicle associated with the respective sensor device caused by a vehicle user,
process the status signals to determine a chronological order of the status changes,
evaluate the determined chronological order and determine therefrom a consistency or an inconsistency of the determined chronological order commensurate with a proper application of a seat belt of the motor vehicle by the vehicle user,
detect with an optical interior space monitoring system of the motor vehicle in conjunction with an automated image processing a proper or an improper placement of the seat belt;
determine the consistency or the inconsistency by comparing a result of the evaluation of the chronological order with a detection result taken from the optical interior space monitoring system of the motor vehicle; and
transmit a control signal via the data interface to a safety device of the motor vehicle only when the inconsistency of the determined chronological order for a proper application persists for at least a predetermined period of time.

10. A motor vehicle, comprising
a safety system comprising
a plurality of sensor devices configured to detect status changes of a respective associated functional unit of the motor vehicle and to transmit to the safety system status signals that indicate the detected status changes, and
a data processing device with a data memory and a data interface for detecting and transmitting data signals
wherein the safety system is configured to
detect, via the data interface, the status signals of several of the plurality of sensor devices of the motor vehicle, wherein the status signals each indicate the status change of the respective functional unit of the motor vehicle associated with the respective sensor device caused by a vehicle user,
process the status signals to determine a chronological order of the status changes,
evaluate the determined chronological order and determine therefrom a consistency or an inconsistency of the determined chronological order commensurate with a proper application of a seat belt of the motor vehicle by the vehicle user,
detect with an optical interior space monitoring system of the motor vehicle in conjunction with an automated image processing a proper or improper placement of the seat belt,
determine the consistency or the inconsistency by comparing a result of the evaluation of the chronological order with a detection result taken from the optical interior space monitoring system of the motor vehicle; and
transmit a control signal via the data interface to a safety device of the motor vehicle only when the inconsistency of the determined chronological order for a proper application persists for at least a predetermined period of time.

* * * * *

UNITED STATES PATENT AND TRADEMARK OFFICE
CERTIFICATE OF CORRECTION

PATENT NO. : 11,104,295 B2
APPLICATION NO. : 16/159082
DATED : August 31, 2021
INVENTOR(S) : Michalke et al.

Page 1 of 1

It is certified that error appears in the above-identified patent and that said Letters Patent is hereby corrected as shown below:

In the Claims

In Column 15, Claim 6, Line 37 replace "of DE the status" with --of the status--.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*